2,945,043

1-(DILOWERALKYLAMINOLOWERALKYL), 5-NITRO, 2-NAPHTHYLMETHYL (AND CERTAIN SUBSTITUTED NAPHTHYLMETHYL) BENZIMIDAZOLES

Karl Hoffmann, Binningen, and Alfred Hunger, Jindrich Kebrle, and Alberto Rossi, Basel, Switzerland, assignors to Ciba Pharmaceutical Products, Inc., Summit, N.J.

No Drawing. Filed June 19, 1958, Ser. No. 743,004

Claims priority, application Switzerland July 17, 1957

5 Claims. (Cl. 260—309.2)

The present invention relates to 1-(lower tertiary amino-lower alkyl)-benzimidazoles containing in the 2-position a naphthyl-methyl radical and in the 5-position a nitro group, as well as to their salts. The invention relates more especially to benzimidazoles of the formula

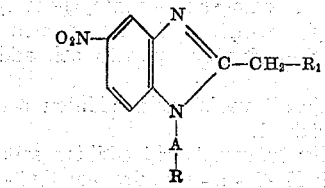

in which A represents a lower alkylene radical, more especially ethylene, and R represents a lower alkylene-imino group which may be interrupted by a hetero atom, such as a piperidino, pyrrolidino or morpholino group, and particularly a di-lower alkyl-amino group, above all the diethylamino group, and in which formula $R_1$ is an α-naphthyl radical which is unsubstituted or substituted by a halogen atom or a lower alkyl or lower alkoxy group, and their salts.

The new compounds have very good analgesic action and have better pharmacological properties than comparable benzylimidazoles, which makes them suitable as analgetics. Of special value, by virtue of its therapeutic properties, is the compound of the formula

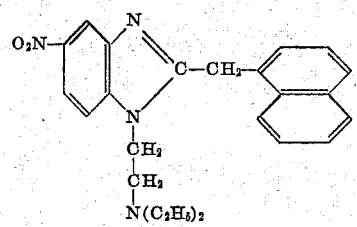

and its salts.

The new benzimidazoles are obtainable by as such known methods. According to one method, for example, the lower tertiary amino-lower alkyl radical is introduced directly or by stages into the 1-position of a 5-nitro-2-naphthyl-methyl benzimidazole. Thus, a 5-nitro-2-naphthyl-methyl-benzimidazole can be reacted with a reactive ester of an alcohol of the formula

HO—A—R′ in which A has the meaning defined above and R′ represents a tertiary amino group or a radical convertible into such a group, e.g. a hydroxyl group, and in the resulting compound containing a radical convertible into the tertiary amino group the said radical is so converted, thus, for example, a hydroxyl group by chlorination and subsequent reaction with a secondary amine. Reactive esters are more especially those of strong inorganic or organic acids, such as those of hydrohalic acids or organic sulfonic acids, such as para-toluene sulfonic acid. The introduction is preferably performed in the presence of a condensing agent, more especially one that is capable of forming metal salts with the 5-nitro-2-naphthyl-methyl-benzimidazoles, such as the alkali and alkaline earth metals, for example sodium, lithium, calcium, their amides, hydrides, hydrocarbon compounds, alcoholates, oxides or hydroxides, e.g. sodamide, sodium hydride, lithium butyl, potassium phenyl, lithium phenyl, potassium tertiary butylate, potassium tertiary amylate, sodium ethylate, sodium oxide or sodium hydroxide, or with the use of the pre-formed metal salts, of the benzimidazoles. This reaction generally yields a mixture of 5-nitro and 6-nitro derivatives which can be separated, for example, by crystallizing their bases or their salts.

According to another process for the manufacture of the new compounds the benzimidazole ring substituted in the 2-position by a naphthyl-methyl group and in the 5-position by a nitro group is formed by subjecting to ring closure a 2-(R″—NH)-5-nitraniline or a suitably N-substituted derivative thereof, R″ representing the above-mentioned group R—A— or a radical convertible thereinto, e.g. a halogeno-alkyl group. The radical convertible into the group R—A— is subsequently so converted, in the case of the halogeno-alkyl group, for example, by reaction with a secondary amine. Thus, for example, a 2-(tertiary-aminoalkylamino)-5-nitraniline can be subjected to direct or stepwise ring closure with a naphthyl-acetic acid or a reactive functional derivative thereof, more especially an ester with an alcohol that is easy to split off, or an iminoether. Furthermore, the final products of the invention can also be obtained by condensation with a naphthyl-acetaldehyde or with a functional derivative thereof, instead of with a naphthyl-acetic acid, the product thus formed then being oxidized. Alternatively, the starting materials may be formed under the conditions employed in the afore-mentioned reactions; thus, for example, a 2-halogeno-5-nitro-naphthyl-acetyl aniline can be subjected to ring closure with a tertiary aminoalkylamine to produce the corresponding benzimidazole derivative.

The reactions of the present process are performed in the presence or absence of diluents and/or condensing agents, if necessary at an elevated temperature, under atmospheric or superatmospheric pressure.

Substituents present in the naphthyl-methyl radical of the products of the invention can be replaced by other groups; thus, for example, a hydroxyl group may be converted into an etherified or esterified hydroxyl group, such as a lower alkoxy group, or a nitro group can be converted into an amino group and the latter converted into a lower alkoxy group or a halogen atom.

According to the reaction conditions employed the new compounds are obtained in the form of their free bases or of their salts. From the salts the free bases can be made in a such known manner. The latter, by being reacted with acids suitable for the formation of therapeutically useful salts, can be converted into salts, for example salts of the hydrohalic acids, sulfuric acid, nitric acid, phosphoric acid, thiocyanic acid, acetic acid, propionic acid, oxalic acid, malonic acid, succinic acid, malic acid, methanesulfonic acid, ethanesulfonic acid, oxyethanesulfonic acid, benzenesulfonic or toluenesulfonic acid or of acids having therapeutic action.

The starting materials are known or can be made by known methods.

The invention further includes those modifications of the process in which the starting material is a compound obtained as an intermediate product at any stage of the process, and the remaining stage or stages are carried out.

The new compounds can be used as medicaments, for example in the form of pharmaceutical preparations containing them or their salts in conjunction with a pharmaceutical organic or inorganic, solid or liquid excipient suitable for enteral, parenteral or topical application. The excipient is made from substances that do not react with the new compound, such for example, as water, gelatine, lactose, starches, magnesium stearate, talc, vegetable oils, benzyl alcohols, gums, polyalkylene glycols, white petroleum jelly, cholesterol or other known medicinal excipients. The pharmaceutical preparations may be, for example, in the form of tablets, dragees, ointments, creams or in liquid form (solutions, suspensions or emulsions). They may be sterilized and/or contain assistants, such as preservatives, stabilizers, wetting agents or emulsifiers, salts for controlling the osmotic pressure or buffers. If desired, they may also contain further therapeutically useful substances.

The following example illustrates the invention:

*Example*

7.2 grams of 2-($\beta$-diethylamino-ethylamino)-5-nitraniline hydrochloride in 90 cc. of glacial acetic acid are added to $\alpha$-naphthylacetic acid imino ether hydrochloride obtained from 12.5 grams of $\alpha$-naphthylacetonitrile, 4.3 cc. of absolute ethanol in 50 cc. of chloroform by introducing dry hydrochloric acid gas at $-10°$ C., allowing the whole to stand for 16 hours at 25° C. and evaporation under diminished pressure. The mixture is then stirred for 20 hours at 40–45° C. The reaction mixture is evaporated under reduced pressure, and the residue taken up in aqueous hydrochloric acid; the acid solution is washed with chloroform, rendered alkaline with ammonia solution, extracted with chloroform, and the chloroform extract is washed with sodium carbonate solution, dried with magnesium sulfate and evaporated.

The resulting crude 1-($\beta$-diethylamino-ethyl)-2-($\alpha$-naphthylmethyl)-5-nitro-benzimidazole is converted into its hydrochloride (melting at 225–226° C.) by dissolution in ethanol and addition of one equivalent of ethanolic hydrochloric acid.

What is claimed is:

1. Benzimidazoles of the formula

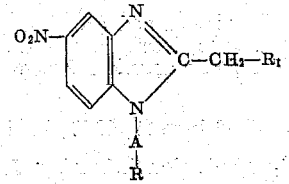

wherein A stands for a lower alkylene radical, R for a di-lower alkylamino group, and $R_1$ for $\alpha$-naphthyl.

2. 1 - ($\beta$ - diethylaminoethyl) - 2 - $\alpha$ - naphthyl - methyl-5-nitro-benzimidazole.

3. A member of the group consisting of 1-($\beta$-diethylaminoethyl)-5-nitro-benzimidazole, containing in 2-position a member selected from the group consisting of $\alpha$-naphthyl-methyl), (halogeno-$\alpha$-naphthyl)-methyl, (lower alkyl-$\alpha$-napththyl)-methyl, and (lower alkoxy-$\alpha$-naphthyl)-methyl and therapeutically useful acid addition salts thereof.

4. Therapeutically useful acid addition salts of the compounds of claim 1.

5. Therapeutically useful acid addition salts of 1-($\beta$-diethylaminoethyl) - 2 - $\alpha$ - naphthyl - methyl - 5 - nitro - benzimidazole.

No references cited.